US011300152B2

(12) United States Patent
Meckstroth et al.

(10) Patent No.: US 11,300,152 B2
(45) Date of Patent: Apr. 12, 2022

(54) SPINDLE NUT RETAINER

(71) Applicant: DEXTER AXLE COMPANY, Elkhart, IN (US)

(72) Inventors: Timothy Allen Meckstroth, Granger, IN (US); Ernest Martin, South Bend, IN (US); John Robert Jurek, Osceola, IN (US)

(73) Assignee: Dexter Axle Company, Elkhart, IN (US)

( * ) Notice: Subject to any disclaimer, the term of this patent is extended or adjusted under 35 U.S.C. 154(b) by 292 days.

(21) Appl. No.: 16/736,002

(22) Filed: Jan. 7, 2020

(65) Prior Publication Data

US 2021/0207643 A1 Jul. 8, 2021

(51) Int. Cl.
*F16B 39/10* (2006.01)
*F16C 19/36* (2006.01)

(52) U.S. Cl.
CPC .......... *F16B 39/103* (2013.01); *F16C 19/364* (2013.01)

(58) Field of Classification Search
CPC ............................. F16B 39/10; F16B 39/103
USPC .................................................. 411/119, 121
See application file for complete search history.

(56) References Cited

U.S. PATENT DOCUMENTS

| | | | | |
|---|---|---|---|---|
| 289,494 A * | 12/1883 | Bender | ................ | F16B 39/10 411/195 |
| 334,790 A * | 1/1886 | McTighe | ................ | F16B 39/10 411/204 |
| 539,692 A * | 5/1895 | Lister | ................ | F16B 39/10 411/121 |
| 1,361,838 A * | 12/1920 | Doty | ................ | F16B 39/02 411/255 |
| 1,603,952 A * | 10/1926 | Huffer | ................ | F16B 39/10 411/204 |
| 1,750,523 A * | 3/1930 | Kaschtofsky | ................ | F16B 39/10 411/197 |
| 2,131,812 A * | 10/1938 | Maguire | ................ | F16B 39/10 411/191 |
| 3,022,809 A * | 2/1962 | Kottsieper | ................ | F16B 39/10 411/197 |
| 4,762,452 A * | 8/1988 | Vogel | ................ | F16B 39/10 411/194 |
| 5,297,854 A * | 3/1994 | Nielsen | ................ | B60B 7/06 301/37.373 |
| 6,896,463 B2 * | 5/2005 | Tuthill | ................ | F16B 39/103 411/121 |

(Continued)

FOREIGN PATENT DOCUMENTS

GB 831377 * 3/1960

*Primary Examiner* — Flemming Saether
(74) *Attorney, Agent, or Firm* — Botkin & Hall, LLP

(57) ABSTRACT

A spindle nut retainer is used with a spindle with a flat portion on its threaded end. The flat portion interrupts the threads on the threaded end. A washer with a mating flat portion is slidably mounted over the threaded end and a nut is removably threaded to the threaded end of the spindle against the washer to set the preload on bearings. The nut retainer overlays a plurality of the corners of the nut and engages the threaded portion of the spindle with tangs. A majority of the tangs are flexed or bent to remain in biased contact with the threads on the spindle. Some of the tangs are located over the flat portion and remain unbent. The tangs resist rotation of the nut by engagement with the flat portion where it meets the threads.

20 Claims, 9 Drawing Sheets

(56) References Cited

U.S. PATENT DOCUMENTS 9,194,420 B2 * 11/2015 Mizuno .................. F16B 39/12

* cited by examiner

SPINDLE NUT RETAINER

BACKGROUND OF THE INVENTION

The present invention relates generally to retaining nuts attached to fixed spindles, and more particularly, to spindle axles for vehicles, including towed trailers, such as boat (marine) and recreational vehicle (RV) trailers. In general, trailers use wheels mounted on spindle axles. Such arrangements are shown in U.S. Pat. Nos. 5,054,859 and 5,551,530. The prior art shows a typical arrangement for connecting a nut to a spindle axle and then retaining the nut to the spindle, against various forces acting upon the nut and spindle during use. That system would include a spindle, having an end which is threaded in any conventional pattern on a cylindrical surface thereof, a washer which is removably slid over surface until abutting a stop or raised portion on spindle (or a tapered roller bearing), a castle nut which is formed with a mating threaded pattern on its interior circumference surface so as to be threaded onto cylindrical surface, and a cotter pin which is removably inserted into passageway extending through spindle adjacent its threaded end. Surface is of sufficient longitudinal dimension that castle nut is threaded onto surface with cotter pin extending through spindle at a location between castle nut and the end face of the spindle. Once mounted onto spindle, the arms or prongs of cotter pin are bent apart to retain the cotter pin in place.

Other methods of retaining nuts to spindles have been suggested for various applications, including forming the nut and/or spindle with special slots, into which anti-rotational clips are inserted once the nut is mounted at the desired location on the spindle. An example of that system is shown in U.S. Pat. No. 5,573,311. In other vehicular applications, various nut retainers have been applied, such as shown in U.S. Pat. No. 6,896,463, and spindle end flats with mating washers have been employed, such as with commercially available Dexter E-Z Lube® spindle axles. These various arrangements can function well to retain the nut to the spindle during use, but they often are more expensive to manufacture and use, and/or are more cumbersome to reuse on those occasions where the nut is intended to be removed from the spindle and then re-applied to the spindle. An improved spindle nut retainer is needed.

SUMMARY OF THE INVENTION

These and other objectives of the present invention are achieved by the provision of a spindle nut retaining system having a spindle with a flat portion on its threaded end, a washer with a mating flat portion slidably mounted over the threaded end, a nut removably threadable to the threaded end of the spindle against the washer, and a nut retainer snap-fit over a plurality of the corners of the nut and formed with a plurality of thread tangs for engaging the threaded portion of the spindle and the flat portion of the spindle. The tangs grip the threaded portion to resist rotation once installed. As installed, at least one of the tangs resides at the intersection of the threads and flat on the spindle. The tang at this location serves as a locking tang and further resists rotation. The retainer can be used with the hub as pictured or with a hub that includes brakes.

To remove the retainer, the user pries between the spindle nut and annular portion of the retainer to urge the tangs outwardly and over the threads of the spindle. The user has to continue to pry to overcome each thread, until all of the tangs are clear of the outermost thread. Once the retainer is removed from the nut completely, the spindle nut can be removed to service the bearings, replace seals, or remove the hub.

Alternatively, the nut retainer can be removed from the nut by flexing or bending the snap-fit tangs away from the nut. If the snap-fit tangs are flexed away, the nut retainer can be immediately reused. If the snap-fit tangs are bent away, they can be rebent into their original position for reuse. Once the snap-fit tangs are flexed or bent away from the nut, the nut retainer can be slid off or threaded off of the spindle, through flexing or bending of the thread tangs. If the thread tangs are so bent for removal, they can be rebent to their original position when reusing the nut retainer. Further, the nut retainer can be formed of frangible material to allow for single use applications where, for example, visible indicium of removal is desirable.

DESCRIPTION OF THE PREFERRED EMBODIMENT

Figure 1:
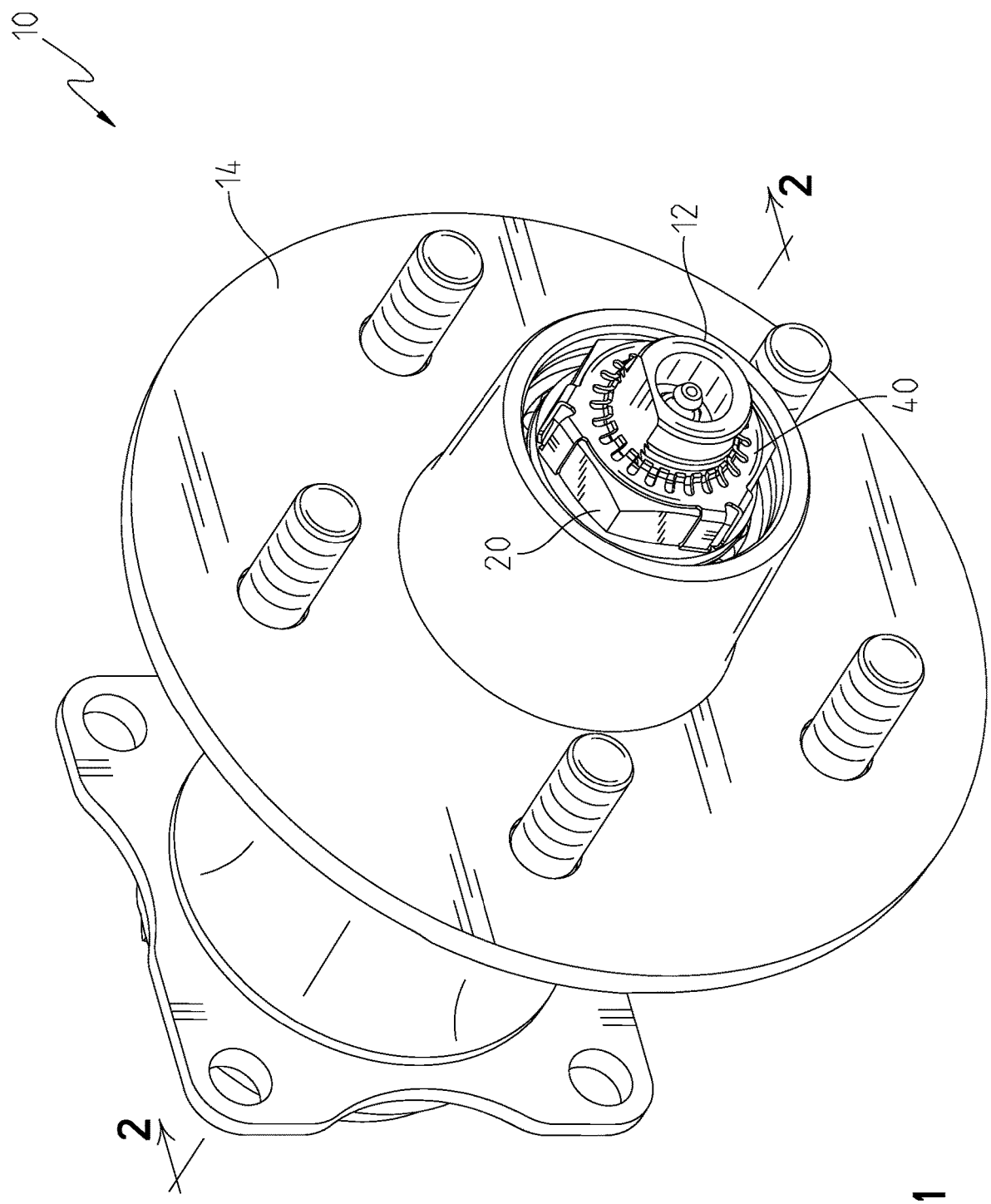
FIG. 1 is an isometric view of the retainer as part of an assembled axle.
Figure 2:
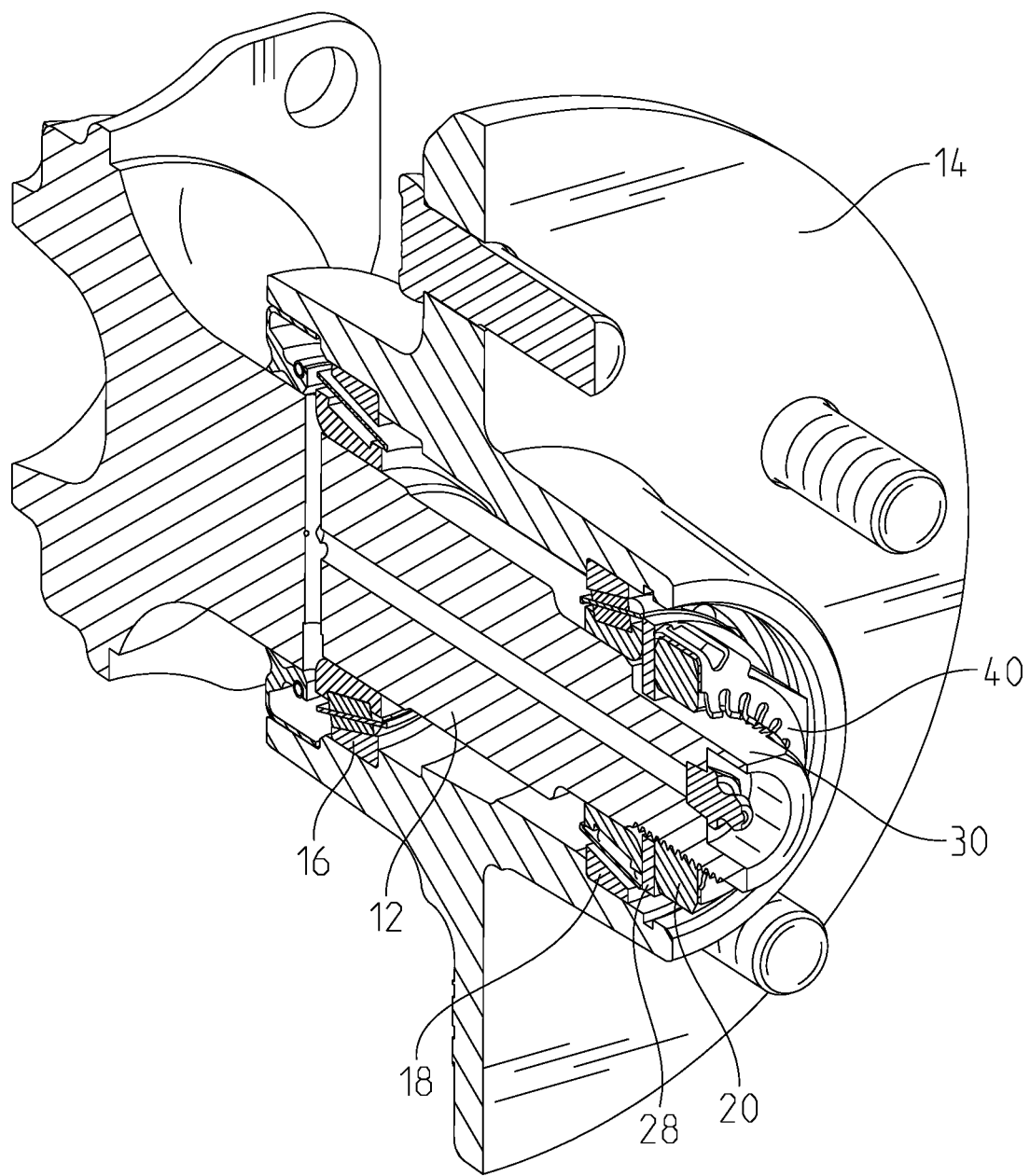
FIG. 2 is a side section view 2-2 of the assembly as shown in FIG. 1.
Figure 3:
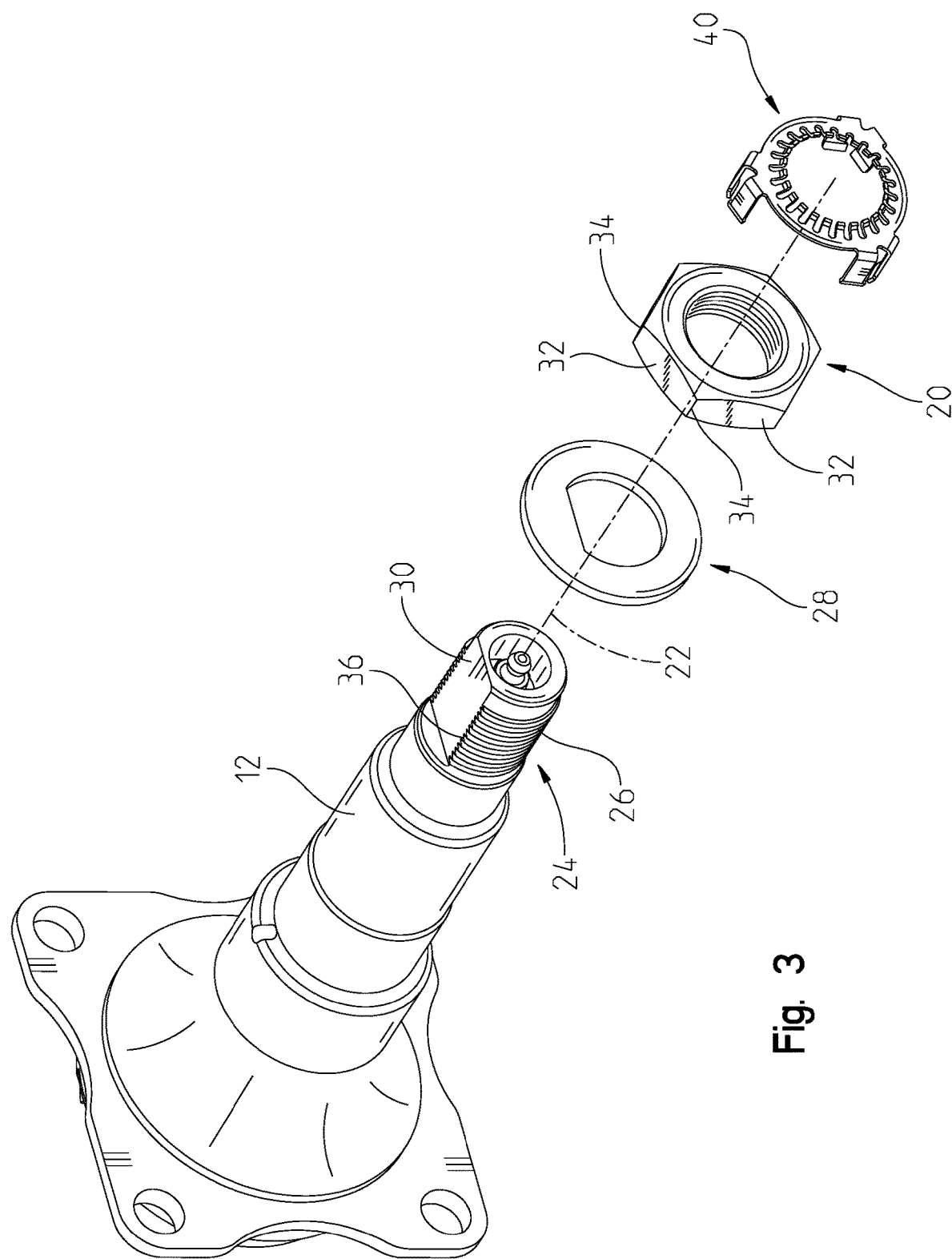
FIG. 3 is an exploded view of the spindle, nut, washer, and retainer from FIG. 1.
Figure 5:
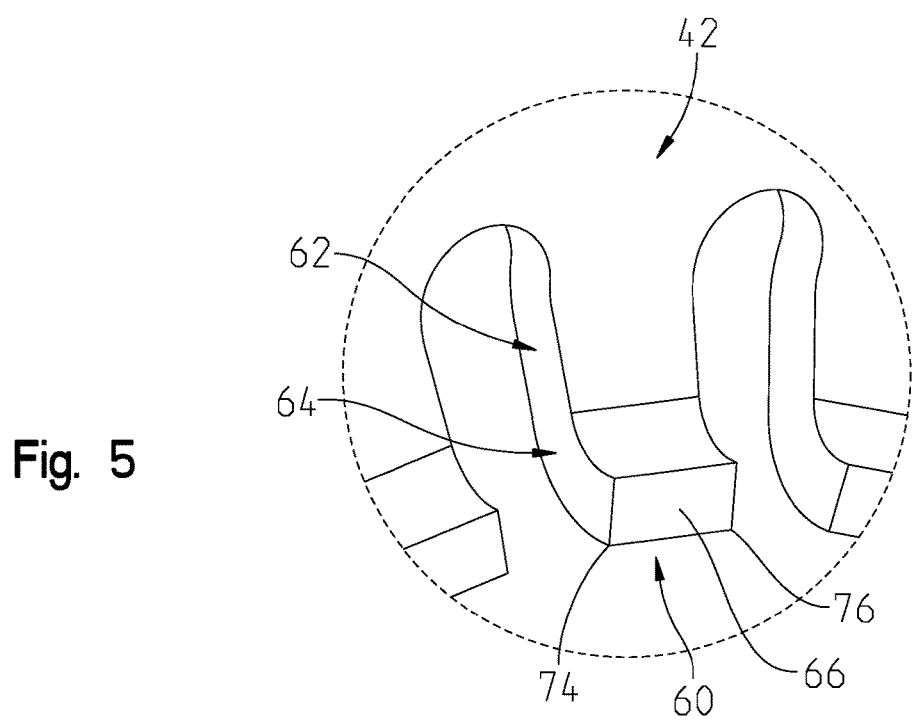
FIG. 5 is a partial view 5 of the retainer in FIG. 4.

A spindle and bearing assembly 10 is shown in FIG. 1 that is used on trailers, vehicles, and other devices with non-driven wheels. The assembly 10 has a spindle 12 that does not rotate and a hub 14 that rotates on the spindle 12 with bearings 16, 18 on its central axis 22. The bearings 16, 18 as shown are commonly tapered roller, but other types are contemplated. For proper bearing life, proper preload of the bearings is critical. This is accomplished by the proper tightening of a single spindle nut 20. The spindle 12, bearings 16, 18, and hub 14 are well-known in the art. If the spindle nut 20 is overtightened, premature and catastrophic bearing failure occurs. If the spindle nut 20 is left too loose, uneven tire wear, trailer wandering, and bearing failure can occur. Therefore, it is critical to properly tighten and maintain the position of the spindle nut 20 after assembly. To retain the spindle nut 20, a retainer 40 is installed over the spindle nut and spindle 12, shown in FIGS. 1, 2, and 6. The retainer 40 engages with the flats 32 and corners 34 of the spindle nut 20. As shown in FIG. 5, the flats 32 on the spindle nut 20 are in common hexagon pattern, with each flat 32 at a 120 degree angle with respect to the adjacent flat 32. The flats 32 of the spindle nut 20 meet at corners 34.

The spindle 12 has a threaded end 24 with threads 26. The threads mate with the spindle nut 20 to retain the hub 14 and bearings 16, 18. A keyed washer 28 is located between the outer bearing 18 and the spindle nut 20. The keyed washer 28 interfaces with the flat 30 to prevent any rotation of the bearing that could urge the spindle nut 20 to rotate. The flat 30 can also be a keyway, notch, or other feature on the threaded end 24 that interrupts the threads 26. A thread edge 36 is defined by the corner where the flat 30 meets the threads 26. The flat 30 is closer to the central axis 22 than the threads 26. The threads 26 have an outside diameter 27 as defined by the tip (or crest) of the threads, shown in FIGS. 8 and 9.

Figure 4:
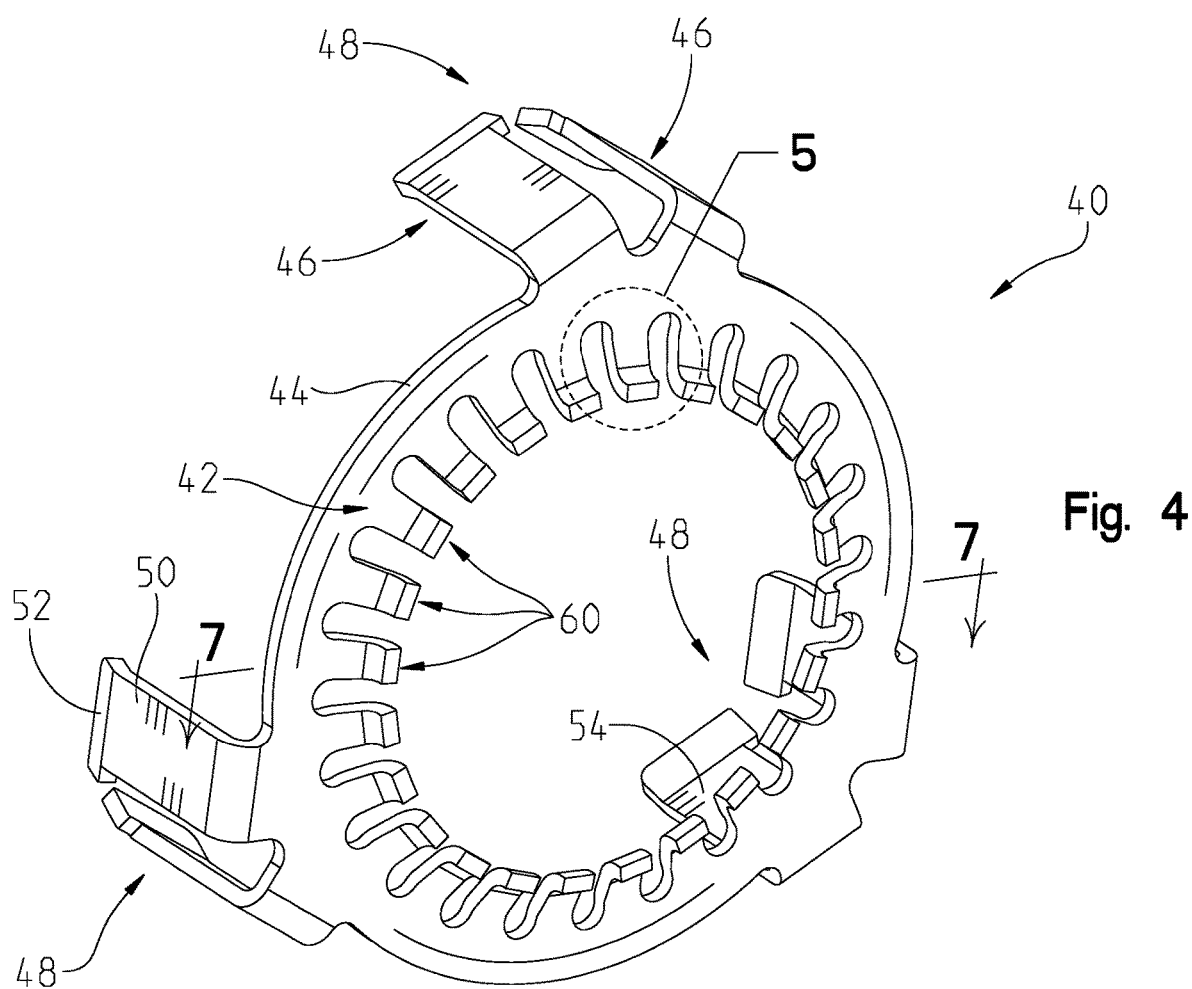
FIG. 4 is an isometric view of the retainer in FIG. 1.

The retainer 40 as shown in FIG. 4 is formed from a single piece of stamped steel or other equivalent material, however it is contemplated that it could be formed from multiple pieces joined together. The retainer 40 is formed from materials that will tolerate some deformation, but then return to its original shape after the deforming force or component is removed. The retainer 40 has an annular portion 42 that is flat and ring-shaped. The annular portion 42 has a side that faces the spindle nut 20 and an opposite side that faces outwardly. The annular portion 42 has an outer edge 44 where retaining fingers 46 are located. The retaining fingers 46 are grouped in pairs 48 and extend perpendicularly from the annular portion 42. It is contemplated that the retaining fingers may be obliquely angled with respect to the annular portion 42, as long as they can still interface with the spindle nut 20 to prevent rotational movement between the nut 20 and retainer 40 once installed. As shown, three pairs 48 are located at 120 degree angles around the outer edge 44. Each finger 46 has a flat portion 50 that extends to a hook portion 52. The flat portion 50 has an inside surface 54 that is planar and is roughly the same length as the flats 32. The hook portion 52 curves inwardly towards the center to grasp the inside facing surface of the spindle nut 20. The flat portion 50 of one finger 46 is parallel to and faces the flat portion 50 on the finger 16 located opposite therefrom.

Figure 7:
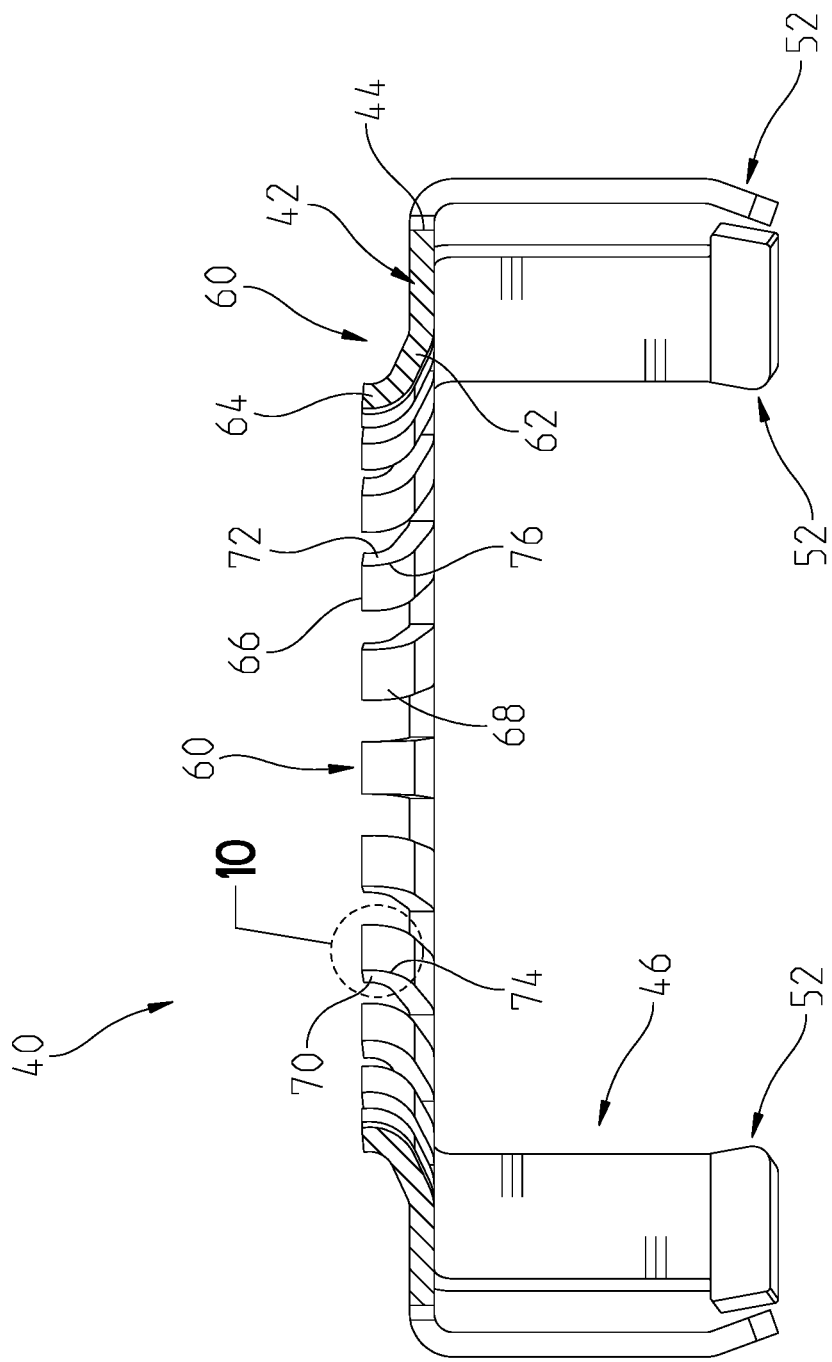
FIG. 7 is a side section view 7-7 of the retainer in FIG. 4.
Figure 10:
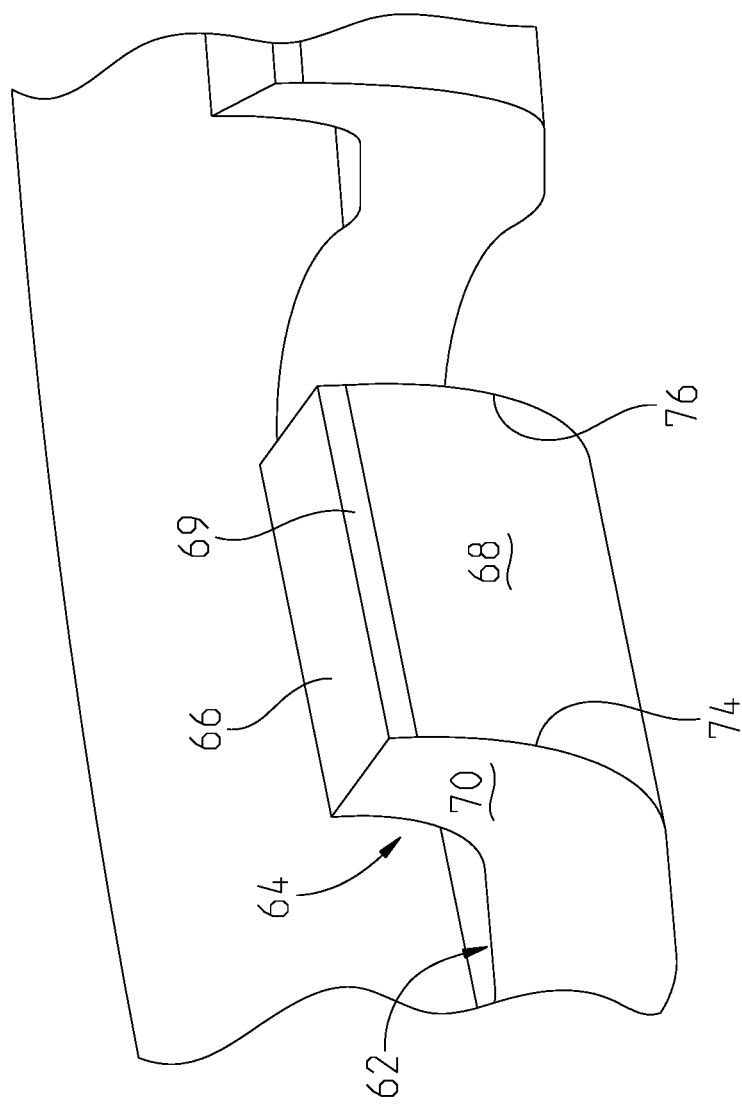
FIG. 10 is a partial isometric view 10 of the retainer in FIG. 7.

The annular portion 42 surrounds a central opening with an array of tangs 60 that extend inwardly into the center. The tangs 60 are all the same with twenty-four in the embodiment as described, but other quantities of tangs are contemplated. The tangs 60 are equally spaced on the annular portion 42. As shown in FIGS. 7 and 10, each tang 60 has a lead-in portion 62 that extends to a catch wall portion 64. The lead-in portion 62 is obliquely angled with respect to the annular portion 42 with the lead-in portion extending away from the annular portion in a direction opposite the retaining fingers 46. The catch wall portion 64 has a terminal end 66 and a thread-facing surface 68. The thread facing surface 68 is shown as having a radius, but it is contemplated that the thread-facing surface 68 is flat or squared off. Between the thread-facing surface 68 and the terminal end 66 is a curl surface 69. Side surfaces 70, 72 meet the thread-facing surface 68 at corners 74, 76.

Figure 8:
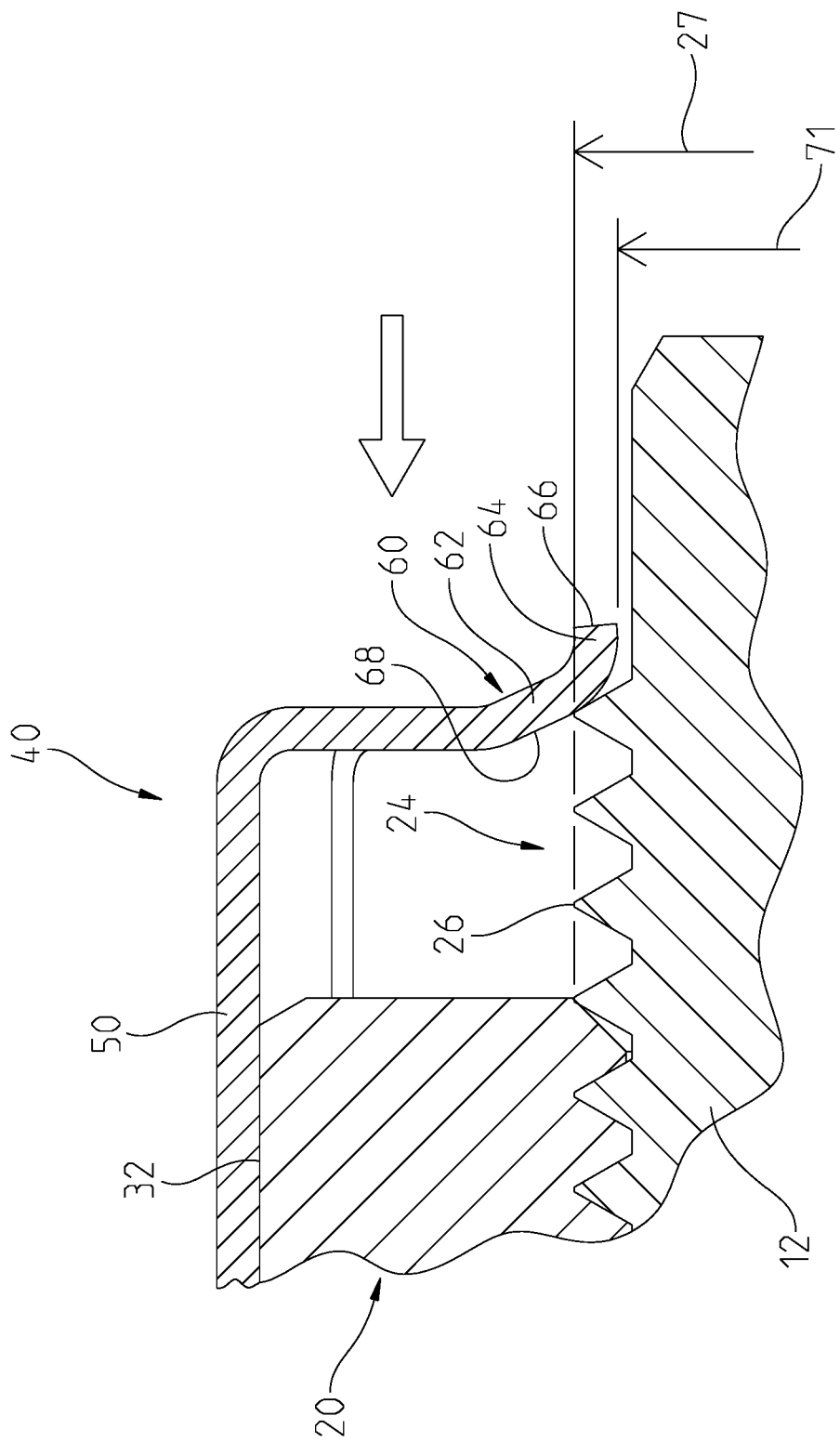
FIG. 8 is a side section view 9 of the retainer in FIG. 2 during the installation process.
Figure 9:
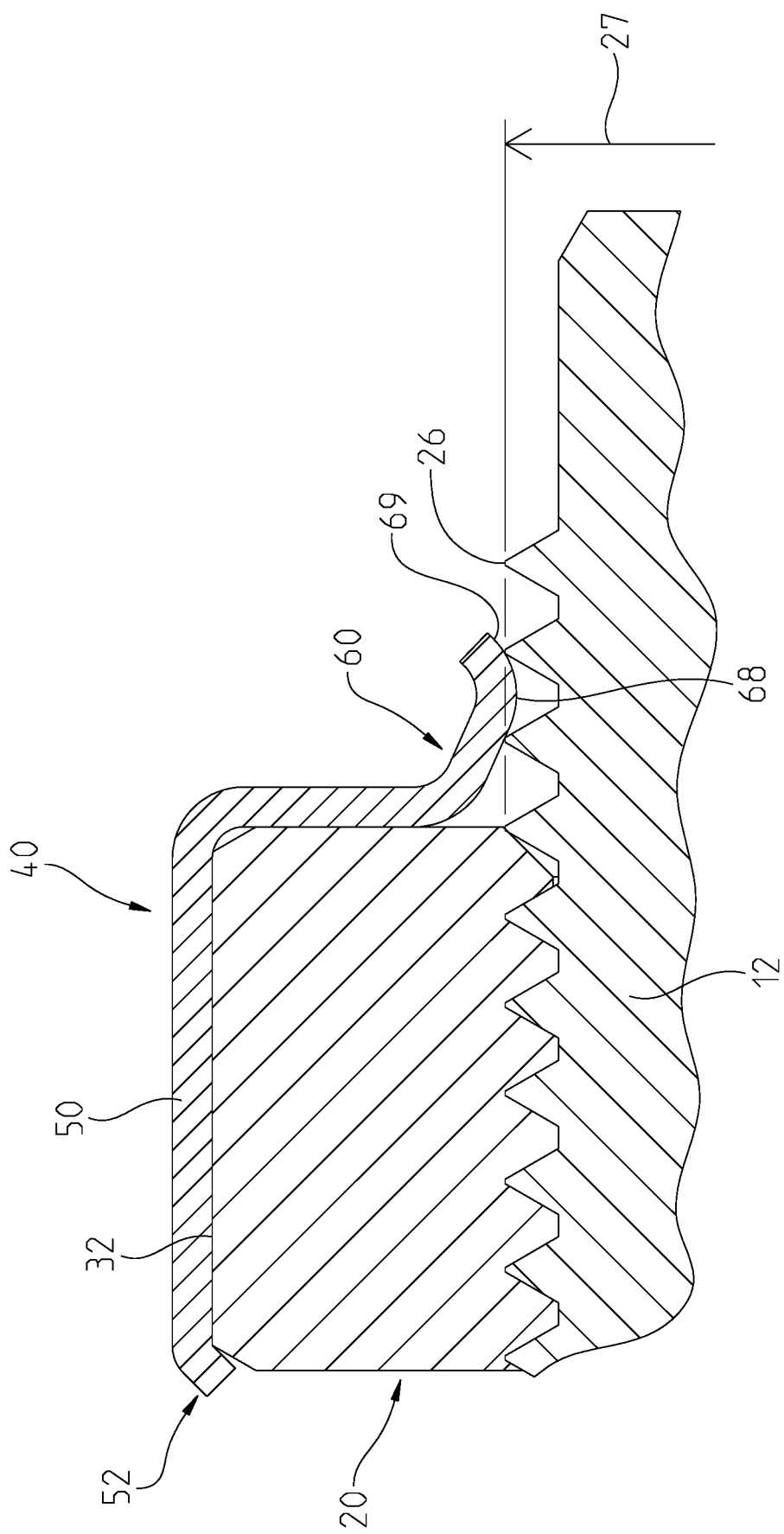
FIG. 9 is a side section view 9 of the retainer in FIG. 2 as installed.

The thread-facing surfaces 68 all form a spindle-retaining diameter 71 that is smaller than the thread diameter 27 with the tangs 60 in their resting position. This is shown in FIG. 8. Each tang 60 is independently moveable between a resting and displaced position, such that displacement of one tang does not impact the position of the adjacent tangs 60. Displaced tangs 60 are shown in FIG. 9 and tangs 60 in the resting position are shown in FIG. 8.

Figure 6:
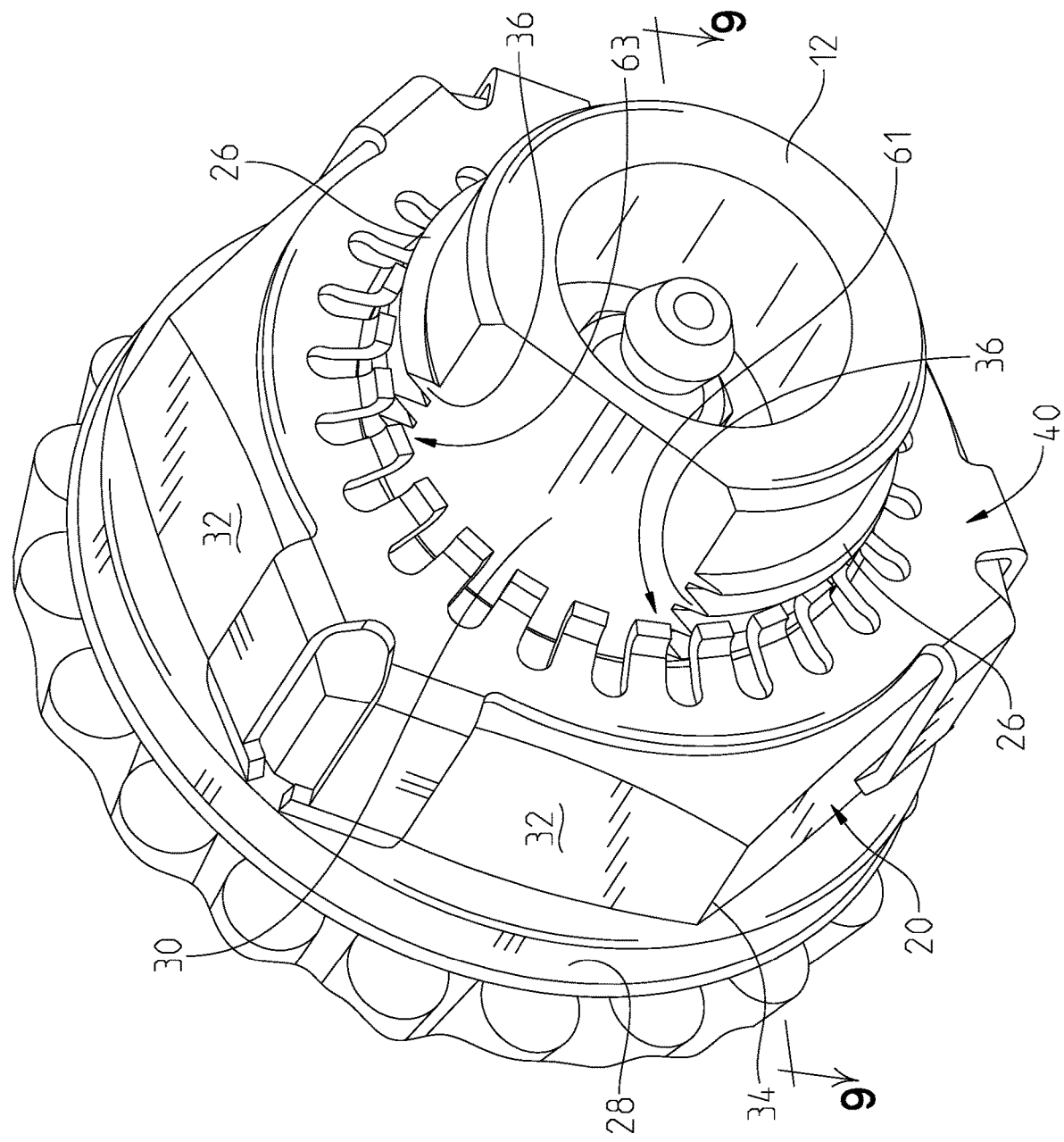
FIG. 6 is a partial view of the retainer as installed in FIG. 1.

As installed on the spindle nut 20 and spindle 12, more than half of the tangs 60 are moved from their resting position to a displaced position by the threads 26, shown in FIG. 1. At least one of the tangs 60 lands adjacent the thread edge 36 on the flat 30, where it is in the resting position or only slightly displaced. As shown in FIG. 6, this tang 60 becomes a locking tang 61 because one of the corners 74, 76 is in biased contact with the flat 30. On the other side of the flat 30 where it meets the thread edge 36, another tang may become a second locking tang 63. The second locking tang 63 has an edge 76, 42 in biased contact with the flat 30 and/or thread edge 36. In the resting position, the corners 74, 76 of locking tangs 61, 63 prevent rotation of the spindle nut 20. Simultaneously, the retaining fingers 46 each overlay a flat 32 on the spindle nut 20 to lock the spindle nut 20 to the retainer 40 to prevent any rotation of the nut 20 with respect to the retainer 40.

To install the retainer 40 on the bearing assembly 10, the bearings 16, 18 are assembled to the hub 14 and then slid onto the spindle 12. The washer 28 is installed and the spindle nut 20 is torqued to specification for proper endplay, run-out, and preload. The retainer 40 is then pushed onto the end of the spindle 12 with the retaining fingers 46 aligned with the corners 34 of the spindle nut 20. The retaining fingers 46 are displaced as the hook portions 52 slide over the flats 32. As the installer continues to push the retainer 40 onto the spindle nut 20, the tangs 60 meet the end of the threads 26, shown in FIG. 8. The lead-in portions 62 center the retainer 40 as the tangs begin to slide over the threads 26. Because the thread diameter 27 is larger than the spindle-retaining diameter 71, the tangs 60 are displaced where they meet the threads 26, shown in FIG. 9. In the area over the flat 30, the tangs 60 may not be displaced at all, depending on how close they are to the thread edge 36. The thread edge 36 is a transition between the threads 26 and the flat 30, which is essential to the function of the retainer 40. Except for the tangs 60 over the flat 30, the tangs 60 are in biased contact with the threads 26, requiring increased force to continue pressing the retainer 40 over the threads 26 and spindle nut 20. Once the annular portion 42 meets the spindle nut 20, the retainer is fully installed, shown in FIGS. 1, 2, and 9. At this same time, the hook portions 52 have moved beyond the flats 32 and are located on the other side of the spindle nut 20.

The retainer 40 prevents rotation of the spindle nut 20 for at least two reasons. First, a majority of the tangs 60 are in biased contact with the threads 26, providing a gripping force from each contacting tang 60. Second, and most importantly, the tangs 60 that are adjacent the thread edge 36 will prevent rotation when the corners 74, 76 engage the flat 30. Because the corner 74, 76 is a relatively sharp surface (compared to the thread facing surface 68), any attempt to rotate the spindle nut 20 and retainer 40 results in one of the locking tangs 61, 63 with its corresponding corner 74, 76 to dig into the flat 30 and/or thread edge 36. The features on the retainer 40 prevent accidental removal or deter removal from the spindle nut 20. As installed, the retaining fingers 46, particularly the hook portions 52 are hooked around the back side of the nut as shown in FIG. 9, requiring displacement of the fingers 46. Over the threads 26, the contacting tangs 60 are in biased contact therewith with some being located between crests of the threads 26, as shown in FIG. 9. Tangs 60 that are located in between crests of threads, either partially or fully, add additional retaining benefits, as any attempt to move the retainer 40 away from the spindle nut 20 would require the tangs 60 to be further displaced to overcome the crest.

To remove the retainer 40, the user will typically pry between the retainer 40 and the spindle nut 20, typically on the annular portion 42. This causes any tangs 60 located between crests to be further displaced outward to slide the retainer 40 off. This repeats for each thread crest the tang 60 encounters as it is being removed. The curl surface 69 assists in the removal and prevents the individual tang 60 from becoming trapped between crests. The retaining fingers 46 are also displaced as the retainer 40 is removed, albeit to a lesser extent.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A spindle nut retainer for constraining a spindle nut on an axle shaft, said axle shaft having a threaded end, said threaded end having threads with an outside diameter to threadably receive said spindle nut, said threads having a notch portion interrupting said threads, said retainer comprising:
    a flat annulus portion surrounding a central aperture, said annulus portion having an outer periphery and an oppositely located inner edge;
    a plurality of hex retaining fingers extending perpendicularly from said outer periphery of said annulus portion, each said hex retaining fingers having a flat portion extending to a hook portion located at a terminal end, said hex retaining fingers grouped in three pairs, said pairs equally spaced around said outer periphery, each said pairs having a first said retaining finger and a second said retaining finger, said flat portion of said first retaining finger angled with respect to said flat portion of said second retaining finger, when said retainer is retaining said spindle nut, each said flat portion is in biased contact with a flat surface on said spindle nut and said hook portion of each said fingers located beyond said flat surface on said spindle nut;
    a plurality of equally spaced tangs extending into said central aperture from said inner edge of said annulus portion, each said tangs having a thread-facing surface on a lead-in portion that extends to a catch wall portion, said lead-in portion obliquely angled with respect to said annulus portion, said catch wall portion obliquely angled with respect to said lead-in portion, said catch wall portions of said tangs forming a spindle-retaining diameter, each said tangs movable between a resting position and a displaced position, said resting position defines said spindle-retaining diameter; and
    when said retainer is installed on said spindle nut and said axle shaft, a portion of said tangs are moved from said resting position towards said displaced position when said thread-facing surface is in biased contact with said threads.

2. The spindle nut retainer of claim 1, when said spindle nut is threaded onto said axle shaft and said spindle nut retainer is retaining said spindle nut, one of said tangs is a locking tang located adjacent to a thread edge located where said notch portion meets and interrupts said threads.

3. The spindle nut retainer of claim 2, wherein said locking tang has a corner contacting said axle shaft adjacent said thread edge to add resistance to rotation of said spindle nut and said retainer.

4. The spindle nut retainer of claim 1, wherein one of said flat portions is parallel to another of said flat portions on another of said pairs of said hex retaining fingers.

5. The spindle nut retainer of claim 1, wherein said hex retaining fingers extending from said annulus portion in a direction opposite said plurality of said tangs.

6. The spindle nut retainer of claim 1, wherein said spindle nut retainer is formed from stamped metal having a uniform thickness.

7. The spindle nut retainer of claim 1, wherein said spindle nut retainer is formed from stamped metal having a uniform thickness.

8. A spindle nut retainer for constraining a spindle nut on an axle shaft, said axle shaft having a threaded end, said threaded end having threads with an outside diameter to threadably receive said spindle nut, said threads having a notch portion interrupting said threads, said retainer comprising:
    an annulus portion surrounding a central aperture, said annulus portion having an outer periphery and an oppositely located inner edge;
    a plurality of hex retaining fingers extending from said outer periphery of said annulus portion, each said hex retaining fingers having a flat portion extending to a hook portion located at a terminal end, said hex retaining fingers grouped in three pairs equally spaced around said outer periphery, each said pairs having a first said retaining finger and a second said retaining finger, said flat portion of said first retaining finger angled with respect to said flat portion of said second retaining finger, when said retainer is retaining said spindle nut, each said flat portion is in biased contact with a flat surface on said spindle nut and said hook portion of each said fingers located beyond said flat surface on said spindle nut;
    a plurality of tangs extending into said central aperture from said inner edge of said annulus portion, each said tangs having a lead-in portion extending to a catch wall portion, said lead-in portion angled with respect to said annulus portion, said catch wall portion angled with respect to said lead-in portion, said catch wall portions of said tangs forming a spindle-retaining diameter, each said tangs movable between a resting position and a displaced position, said resting position defines said spindle-retaining diameter; and
    when said retainer is installed on said spindle nut and said axle shaft, a portion of said tangs are moved from said resting position towards said displaced position.

9. The spindle nut retainer of claim 8, when said spindle nut is threaded onto said axle shaft and said spindle nut retainer is retaining said spindle nut, one of said tangs is a locking tang located adjacent to a thread edge located where said notch portion meets and interrupts said threads.

10. The spindle nut retainer of claim 9, wherein said locking tang has a corner contacting said axle shaft adjacent said thread edge to add resistance to rotation of said spindle nut and said retainer.

11. The spindle nut retainer of claim 8, wherein one of said hex retaining fingers facing a non-adjacent said hex retaining finger.

12. The spindle nut retainer of claim 8, wherein said spindle nut retainer is formed from stamped metal having a uniform thickness.

13. The spindle nut retainer of claim 8, wherein said hex retaining fingers extending from said annulus portion in a direction opposite said plurality of said tangs.

14. The spindle nut retainer of claim 8, wherein said retaining fingers are disposed around said outer periphery to engage with flats on said spindle nut.

15. A spindle nut retainer for constraining a spindle nut on an axle shaft having a central axis, said axle shaft having a threaded end, said threaded end having threads with an outside diameter to threadably receive said spindle nut, said threads having a notch portion interrupting said threads, said retainer comprising:
- an annulus portion surrounding a central aperture, said annulus portion having an outer periphery and an oppositely located inner edge;
- a plurality of hex retaining fingers extending from said annulus portion, each said hex retaining fingers for contacting said spindle nut to prevent rotation of said nut with respect to said retainer;
- a plurality of tangs extending into said central aperture from said annulus portion, each said tangs having a thread-facing surface on a lead-in portion extending to a catch wall portion, said tangs forming a spindle-retaining diameter, each said tangs movable between a resting position and a displaced position, said resting position defines said spindle-retaining diameter; and
- when said spindle nut is threaded onto said axle shaft and said spindle nut retainer is retaining said spindle nut, one of said tangs is a locking tang located adjacent to a thread edge located where said notch portion meets and interrupts said threads, a portion of said tangs are moved from said resting position towards said displaced position by said threads.

16. The spindle nut retainer of claim 15, wherein each said hex retaining fingers having a hook portion located at a terminal end, when said retainer is retaining said spindle nut, each said retaining finger is in biased contact with a surface on said spindle nut and said hook portion of each said fingers located beyond said surface on said spindle nut.

17. The spindle nut retainer of claim 15, wherein said annulus portion having a first side and an oppositely located second side, said hex retaining fingers extend from said first side, said tangs extend from said second side.

18. The spindle nut retainer of claim 15, wherein said lead-in portion is obliquely angled with respect to said annulus portion and said catch wall portion is obliquely angled with respect to said lead-in portion.

19. The spindle nut retainer of claim 15, wherein said tangs located over said notch portion are closer to said central axis than said tangs over said threads.

20. The spindle nut retainer of claim 15, wherein said locking tang has a corner contacting said axle shaft adjacent said thread edge to add resistance to rotation of said spindle nut and said retainer.

* * * * *